Patented July 27, 1943

2,325,359

UNITED STATES PATENT OFFICE 2,325,359

CHEMICAL PROCESS AND PRODUCT

Walter P. Arnold, Orrville, and Ernest R. Boller, Twinsburg Township, Summit County, Ohio, assignors to E. I. du Pont de Nemours & Company, Wilmington, Del., a corporation of Delaware No Drawing. Application September 19, 1940, Serial No. 357,414

2 Claims. (Cl. 167—38.5)

This invention relates to preservative compositions, to processes employing them, and to products preservatively treated with them, and is more particularly directed to preservatives for cellulosic materials comprising zinc chloride, cupric chloride, a minor proportion of arsenic pentoxide, and preferably also sodium dichromate, to processes for preservatively treating cellulosic materials with such preservatives, and to the preservatively treated cellulosic materials produced.

By reason of a long record of successful use, zinc chloride has come to be accepted as a standard of comparison for wood preserving compositions. Wood treated with zinc chloride possesses a high general resistance to decay. The zinc chloride has a relatively high degree of permanence in the wood, that is, it is not rapidly leached out of the wood upon exposure to moisture. It does not discolor the wood, and hence the treated wood may be painted or otherwise finished to give it added protection. Zinc chloride, being water soluble, is easy to use as a preservative by a variety of processes. Zinc chloride acts as a fire-retardant, substantially decreasing the flammability of wood treated with it. These and other advantages coupled with the relatively low cost of zinc chloride have made it one of the most widely used preservatives for cellulosic materials.

While in a general sense zinc chloride is an excellent wood preservative, any modification of it which would improve its properties, such as its permanence in treated products, would enhance its usefulness. For instance, the addition of sodium dichromate to zinc chloride preservatives has recently been shown to cause a remarkable increase in the decay-resistance of wood treated with the mixture, and compositions containing about one part of sodium dichromate to five parts of zinc chloride are being widely adopted as wood preservatives for this reason.

The addition of sodium dichromate to zinc chloride also reduces corrosion of steel equipment employed in the treating process and furthermore reduces corrosion of hardware affixed to the treated wood. This decrease, particularly in hardware corrosion, extends greatly the uses to which the treated wood can be put.

Numerous compounds which have been proposed for use as wood preservatives have been found unsuitable for the reason that they cause severe corrosion of hardware affixed to the treated wood. For instance, copper salts were known to have definite fungicidal action, but when solutions of copper salts are brought into contact with steel such as treating equipment or hardware, copper plates out on the steel by electrolytic action, this action being termed "copper flashing." This tendency of copper salts to cause copper flashing, together with the fact that the permanency of such salts in treated wood is not all that may be desired, has mitigated against the widespread commercial adoption of copper salts for the preservation of wood.

Now we have found that remarkable resistance to deterioration by fungal and insect attack is imparted to cellulosic materials by treating them with compositions comprising zinc chloride, cupric chloride, a minor proportion of arsenic pentoxide, and sodium dichromate. We have found that the toxicity of zinc chloride and of zinc chloride-sodium dichromate compositions is greatly increased by the addition of cupric chloride and a minor proportion of arsenic pentoxide, and that the permanence of such modified compositions in cellulosic materials preservatively treated with them is greater than the permanence of unmodified zinc chloride or zinc chloride-sodium dichromate preservatives. The modified compositions, moreover, are substantially free of the tendency toward copper flashing which would be expected in preservatives containing copper salts.

The proportions of components in the preservative compositions of our invention may best be described in terms of dry solids, although it will be understood that the compositions may be supplied to users as solutions as well as in the dry state. Of 100 parts by weight of dry active ingredients one or two parts should be arsenic pentoxide. From about 3 to about 80 parts should be cupric chloride, and the remainder should be zinc chloride-sodium dichromate mixture. It is preferred, however, to use such amounts of cupric chloride and sodium dichromate that zinc chloride accounts for from about seventy to eighty-five per cent of the total weight of salts. A preferred composition of our invention would therefore contain from about seventy to eighty-five per cent of anhydrous zinc chloride, from about three to twenty-nine per cent anhydrous cupric chloride, from about one to two per cent arsenic pentoxide, and from about zero to twenty-six per cent anhydrous sodium dichromate.

According to a process of our invention, resistance to fungal and insect attack is imparted to a cellulosic material by treating it as, for instance, by impregnation, with a composition comprising zinc chloride, cupric chloride, a minor proportion of arsenic pentoxide, and sodium dichromate. For the purposes of illustration, our novel processes will be described hereinafter with special reference to the preservative treatment of wood, but it will be understood that other cellulosic materials may similarly be treated. This treatment may be accomplished by procedures which differ as to details but which have the common characteristic of securing penetration of the preservative compositions into the material being treated. For instance, when treating wood the preservative solution may be applied by immersing the wood first in a hot solution and then in a cold solution, or by soaking the wood in the solution for an extended period without substantial change in temperature, or by spraying, or by painting. It is preferred, however, to inject the solution into the wood under pressure, since this makes possible excellent extent and uniformly of impregnation of the wood with the preservative solution.

Such conditions as temperatures, pressures, times of treatment, concentration of treating solution, and similar factors are determined largely by the character of the wood being treated and by the extent of treatment desired. Ordinarily a solution containing from about two to ten per cent of the preservative composition will be found satisfactory. Much of the experience of the art in employing zinch chloride preservative solutions is applicable in using the preservative compositions of our invention.

The equipment used for applying our novel preservative compositions may be that heretofore used in applying zinc chloride solutions. It is observed that ordinary steel equipment may be used without excessive corrosion or difficulty due to copper flashing, despite the presence of a copper salt in the preservative compositions.

In appearance and general suitability, wood preservatively treated with a composition of our invention resembles the product heretofore obtained by treating wood with zinc chloride solutions with which the art is already familiar. With regard to its resistance to deterioration upon exposure, however, wood treated with a composition of our invention shows definite superiority.

While the compositions of our invention have been described particularly with reference to wood, it will be understood that other cellulosic materials such as paper, wallboard and fibreboard may similarly be treated.

In effecting a treatment of a cellulosic material according to a process of our invention, the material should be impregnated to an extent such that about from 0.25 to 1.50 pounds of the salt on a dry basis is retained per cubic foot of cellulosic material. The exact retention to be used will depend on various factors such as the nature of the material treated and the expected conditions of exposure.

While we have shown certain specific preservative compositions and processes and certain preservatively treated materials, it will be understood that without departing from the spirit of our invention one skilled in the art may employ numerous compositions and processes and produce numerous preservatively treated products.

We claim:

1. A preservative composition to be dissolved in water and used for treatment of cellulosic materials comprising as essential active ingredients zinc chloride, cupric chloride, arsenic pentoxide, and sodium dichromate, the said ingredients being present in substantially the following proportions: 70 to 85% anhydrous zinc chloride, 3 to 29% anhydrous cupric chloride, 1 to 2% arsenic pentoxide, and the balance anhydrous sodium dichromate.

2. In a process for preservatively treating a cellulosic material the step comprising treating the cellulosic material in a single aqueous solution in which is dissolved an effective amount of a preservative composition comprising as essential active ingredients zinc chloride, cupric chloride, arsenic pentoxide, and sodium dichromate, the said ingredients being present in substantially the following amounts: 70 to 85% anhydrous zinc chloride, 3 to 29% anhydrous cupric chloride, 1 to 2% arsenic pentoxide, and the balance anhydrous sodium dichromate.

WALTER P. ARNOLD.
ERNEST R. BOLLER.